United States Patent [19]

Dick et al.

[11] 4,077,735
[45] Mar. 7, 1978

[54] CUTTING TOOL AND INSERT ASSEMBLY

[75] Inventors: David Cochrane Dick; Fred Bauer, both of Islington, Canada

[73] Assignee: General Electric Company, Schenectady, N.Y.

[21] Appl. No.: 732,248

[22] Filed: Oct. 14, 1976

[51] Int. Cl.² ........................................ B26D 1/00
[52] U.S. Cl. .................................. 407/89; 407/4; 407/5; 407/90; 407/112; 407/113
[58] Field of Search ................................ 29/96, 95 R

[56] References Cited

U.S. PATENT DOCUMENTS

| | | | |
|---|---|---|---|
| 1,222,643 | 4/1917 | Lovejoy | 29/96 |
| 1,351,467 | 8/1920 | Chapin et al. | 29/96 |
| 2,627,106 | 2/1953 | Sheridan | 29/95 R |
| 3,303,553 | 2/1967 | Severson | 29/96 |

*Primary Examiner*—Leonidas Vlachos

[57] ABSTRACT

In cutting tools employing disposable inserts an indexing shoulder is generally provided on the body of the tool. When exposed to excessive force the shoulder may be damaged and the tool difficult to repair. This invention proposes a replaceable seat which is indexed to the tool, and wherein the seat is provided with an shoulder against which the insert is indexed. In the preferred embodiment the insert is provided with a transverse channel in its seating surface and the seal with a mating land. The arrangement provides for forward and reverse indexing of the insert, and is of particular utility in positive rake and tracer cutting tools.

28 Claims, 1 Drawing Figure

U.S. Patent  March 7, 1978  4,077,735
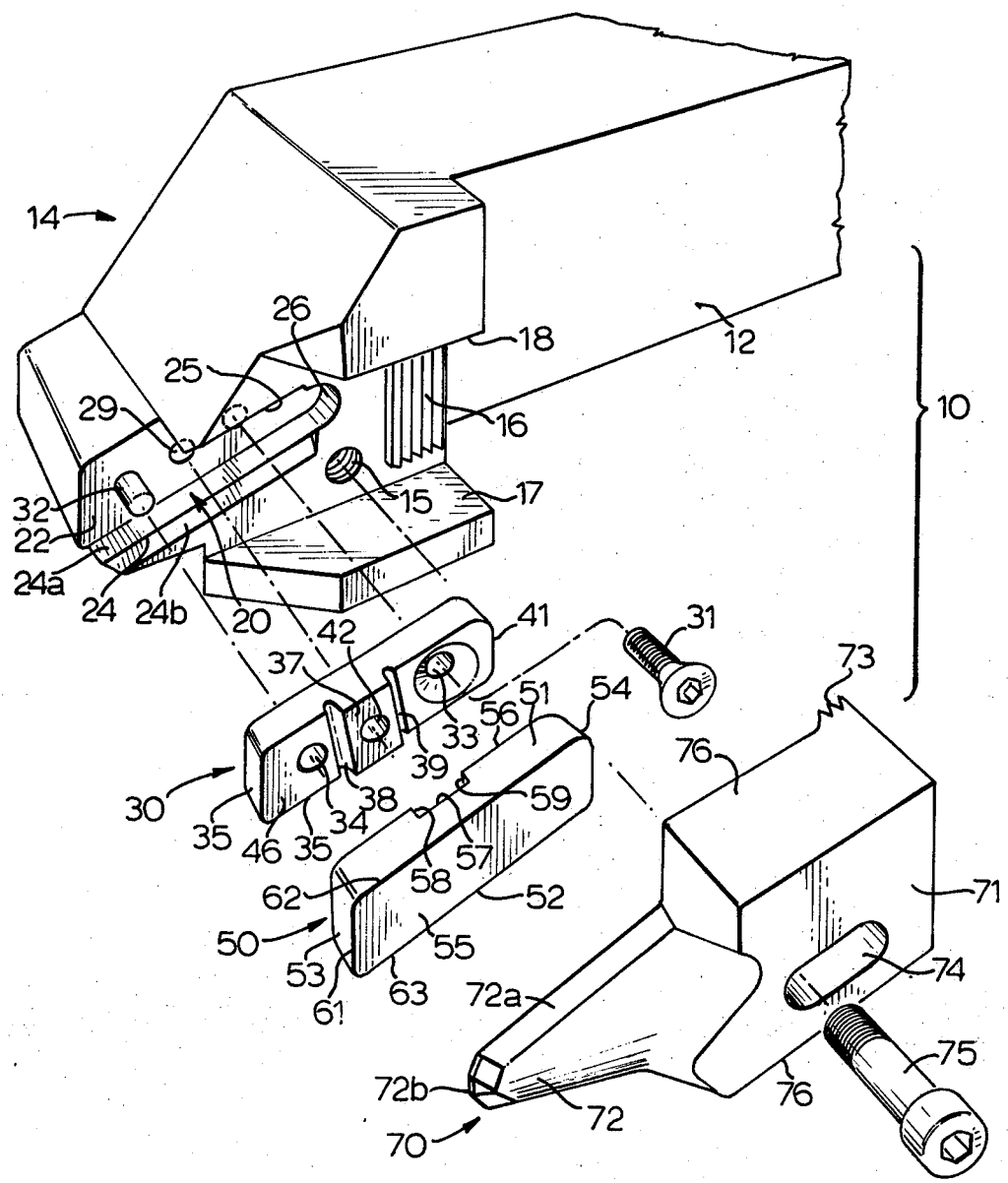

CUTTING TOOL AND INSERT ASSEMBLY

The present invention concerns cutting tools of a type using disposable inserts.

In cutting tools of the aforesaid type, indexing of the cutting edge is generally assured by crowding a rearward facing sidewall of the insert against a shoulder upstanding from the body of the cutting tool. In digitally controlled machining operations the cutting tool is programmed to make a depth of cut within its capability. However, in making a first cut upon an uneven or damaged surface, a sufficient excess of machining stock may be encountered so as to cause the tool to wedge into the workpiece. The reactive force generated between the indexing shoulder and the insert may be sufficiently high to damage the shoulder, thereby destroying the indexability of the tool.

In its broadest aspect, our invention comprises forming the indexing shoulder upon a seat which is detachable from the body of the toolholder and which is secured thereto by replaceable indexing means. Whilst excessive force may damage the indexing shoulder of the seat and also the replaceable seat indexing means, the damage rarely extends to the body of the toolholder. The damaged cutting tool may usually be replaced in service without disturbing its preset cutting position.

A further problem is peculiar to positive rake inserts wherein the relief angle is formed on the sidewall of the insert. The indexing body shoulder is usually ground in conformity with the relief angle of the insert. The transmission of a horizontal thrust between the insert and the body will result in a vertical thrust component being generated at the sloping reaction surfaces. This vertical component may be sufficiently large that the downward clamping pressure is exceeded. The insert then rides up the indexing body shoulder to lose its indexed position.

A further aspect of our invention comprises forming the insert with a transverse indexing shoulder intermediate the axial ends of the insert, and providing the seat with a mating shoulder. The insert shoulder and mating seat shoulder will generally be in the vertical plane, such that transmission of a horizontal axial thrust between the insert and the body of the tool will be without the generation of a vertical thrust component.

In cutting tools of the aforesaid types which are to be employed for tracer cutting, the insert may be required to resist forces which no longer crowd the insert against an indexing shoulder, but on the contrary tend to withdraw the insert from its indexed position.

A still further aspect of our invention is to provide the insert with a second transverse shoulder facing oppositely to the first shoulder. The tool body is provided with a dependent shoulder which engages the second transverse shoulder, whereby reverse axial thrust is transmitted between the insert and the body.

Our invention will now be described with reference to a specific embodiment thereof, as illustrated in the accompanying drawing, which shows a cutting tool in an exploded perspective view.

A cutting tool constructed in accordance with our invention is designated generally by the numeral 10; the tool comprises a body 12 including a head portion 14 having a horizontal base 22. A replaceable seat 30 is mounted on base 22 by replaceable indexing and securing means formed by screw 31 and pin 32. Seat 30 is perforate at 33 and 34 to enable the securing means to pass therethrough. Where seat 30 is subject to axial forces significantly greater than that for which it is designed, the indexing means will normally shear, and it may be relatively easily and economically repaired. For heavy duty cutting operations and long service life, seat 30 is preferably constructed of a sintered carbide such as tungsten carbide. The top surface 46 and bottom surface 47 of seat 30 are generally contained in parallel planes, and as mounted, each surface 46 and 47 is defined as being horizontal. Seat 30 extends axially from front sidewall portion 35 to rear sidewall portion 41.

A disposable insert 50 is mounted on seat 30; insert 50 has a cutting edge 61 formed by intersecting top surface 55 and side surface 53, this edge being exposed from the head 14 of cutting tool 10. Insert 50 has a rearward facing transverse shoulder 58 which engages a forward facing shoulder 38 provided on seat 30. Shoulders 58 and 38 are generally vertical, hence a horizontal axial thrust on insert 30 will be totally transmitted to body 12 without producing an upward thrust component on insert 50 which would tend to lift the latter from seat 30.

Contact pressure between insert 50 and seat 30 is generated by overhead clamp 70. Clamp 70 comprises a body portion 71, a nose portion 72 and a heel portion 73. Clamping pressure is generated by bolt 75 which passes through a hole 74 formed in body 71 to engage a screwed hole 15 provided in body 12. Hole 74 is elongated in a generally axial direction to permit axial adjustment of clamp 70. Indexing is accurately maintained by transverse teeth formed on heel portion 73 which mesh with mating teeth 16 provided on body 12. Lateral positioning of clamp 70 is additionally ensured by cheeks 17 and 18 which are vertically upstanding from head portion 14 on each side of base 22, the cheeks closely surrounding the lateral sidewalls 76 of clamp 70. The accurate positioning at clamp 70, and also the means to accurately maintain an indexed position, enable nose 72 to perform a chip breaking function. The surface of nose 72 which contacts insert 50 is desirably formed from a sintered material such as tungsten carbide, as at 72a; this may be joined to nose 72 by brazing for example. The tip of portion 72a may be faceted as at 72b to provide the chip breaking surface.

Insert 50 has a second transverse shoulder 59 which is forward facing; a mating shoulder 39 is provided on seat 30 to engage therewith. Shoulder pair 59/39 transmit reverse axial thrust between insert 50 and body 12 which would tend to draw insert 50 forwardly and disengage shoulder pair 58 and 38. They thus provide a reverse axial index for positioning insert 50.

The placement of shoulder 58 is not critical; indeed, the shoulder could be identical with or part of transverse side surface 54 of insert 50. However, in positive rake cutting tools wherein a relief angle is provided in side surface 54 as herein, it is preferred that shoulder 58 be situated intermediate the axial ends of insert 50, whereby shoulder 58 and mating shoulder 38 may be formed so as to transmit horizontal thrust without tending to lift insert 50, thereby overcoming the problem earlier spoken of. A further important advantage of forming shoulder 58 intermediate the axial ends of insert 50 is that the shoulder may be placed at any desired horizontal angle relative to the axis of the insert, whereby lateral thrust reactants may be minimized. Where side surface 54 is employed as an indexing shoulder, the horizontal angle of that surface is controlled primarily by the horizontal relief required in a cutting operation, and this may be in apposite to ensuring good indexing. Additionally our preferred arrangement provides for the use of inserts 50 having different horizontal relief angles in the same tool body 12.

Shoulder 59 is required to transmit only reverse axial thrust, i.e. a force which tends to draw insert 50 forwardly. Reverse thrust is generally of a relatively low magnitude, hence lateral and vertical thrust components generated at the reaction surface are usually easily contained. For this reason rearward facing shoulder 59 may be located on any convenient position of insert 50, and engaged by a forward facing shoulder dependent from any convenient part of tool 10 that is secured to body 12.

Shoulders 58 and 59 may be readily and most desirably formed by providing at least one channel opening 57 in insert 50. Where the insert is otherwise symmetrical any channel opening or openings 57 will be located such as to retain the symmetry. In the insert 50 illustrated there is a vertical rotational axis of symmetry which passes centrally through channel opening 57. When rotated in a horizontal plane through 180°, shoulders 58 and 59 of channel 57 thus interchange.

Seat 30 is formed with a land portion 37 which mates with channel opening 57. It will be apparent that channel 57 could be located in seat 30 and land 37 in insert 50 if desired. Generally speaking it is preferred that channel 57 be provided with vertical walls (shoulders) 58 and 59, for reasons already described. The depth of channel 57 will not generally be greater than about 33% of the thickness of insert 50 in order that an adequate stiffness of the insert be preserved. Land 37 may have vertical mating walls (shoulders) 38 and 39, or alternatively they may be outwardly sloping such that in axial cross section they are slightly dovetailed. It is also preferred for ease of forming seat 30 and insert 50 that channel 57 and land 37 be coextensive with the transverse dimension in which they are cut or otherwise formed.

Insert 50 has lateral cutting edges 62 and 63 formed by intersecting surface 55 and side surfaces 51 and 52 respectively. When cutting with these lateral edges, insert 50 experiences a transverse thrust. Head 14 is therefore provided with axially aligned shoulders 24 and 25 to index insert 50. Shoulder 24 and base 22 define a pocket opening 20 in head 14, which pocket may also include shoulder 25. The forward portions of each of shoulders 24 and 25 are elided in order to expose cutting edges 62 and 63 sufficiently. The transverse thrust thus exerts a significant rotary moment upon insert 50, the forward tip of either elided shoulder 24 or 25 functioning as a fulcrum. In a positive rake cutting tool as herein wherein insert 50 is provided with a relief angle in axial sidewalls 51 and 52 and wherein supporting shoulders 24 and 25 are outwardly inclined also at the relief angle, the rotary moment can be sufficiently great that insert 50 will tend to climb the pocket walls. The rotary moment may be further increased by thermal expansion of the forward portions of shoulders 24 and 25, because of their significantly reduced thermal mass. In our tool we find that the pairs of thrust surfaces formed by shoulder pairs 58/38 and 59/39 effectively contain the thrust and precludes rotary movement of insert 50. Also, these shoulder pairs being relatively removed from the cutting zone and being formed in massive parts of tool 10, they remain unaffected by thermal expansion effects.

As previously mentioned, insert 50 is of a positive rake type. A relief angle of about 5° is provided in each of side walls 51, 52, 53 and 54. Care must be exercised in mounting insert 50 so that it is properly supported by shoulders 24 and 25, whilst making firm contact between the insert and its seat 30. Seat 30 is formed such that the lateral sidewalls thereof i.e. those generally underlaying sidewalls 51 and 52 of insert 50, are vertical. The lower portion of shoulder 24, shown as 24a, and that of shoulder 25, which may not be seen in the drawing, rises vertically from base 22 to the thickness of seat 30, following which portion 24b opens out at the relief angle proved on insert 50; shoulder 25 is similarly formed. A positive tolerance of up to about 30 seconds in the opening angle of sidewall portion 24b, and that of the similar portion of sidewall 25b, generally ensures adequate lateral support of insert 50 and yet permits it to be firmly seated on seat 30. An opening 29 is provided in base 22 which communicates with the underside of head 14; a matching opening 42 in seat 30 permits a rod to be inserted from the underside of head 14 to knock out insert 50 in the event that this becomes wedged in pocket 20. The portions of sidewall 35 of seat 30 forward of shoulder 38 may be ground at the relief angle of insert 50, but it is not found to be necessary to conform sidewall 24a, or the corresponding part of sidewall 25, in this area.

Lateral sidewalls 24 and 25 may be interconnected at the rear of base 22 by transverse portion 26. Since portion 26 is not required to index and support either seat 30 or insert 50, it may be spaced from rear facing shoulders 41 and 54 of each of these components.

The embodiments of the invention in which an exclusive property or privilege is claimed are defined as follows:

1. In a cutting tool having a body including a planar surface portion, a detachable seat having top and bottom surfaces contained in generally parallel planes, a disposable insert mounted on said seat, said insert having a front cutting edge and extending rearwardly from said edge in a generally axial direction, clamp means secured to said body for exerting a clamping pressure on said insert, the improvement wherein said seat is indexably secured to said planar surface by replaceable securing means, said seat having a forward facing shoulder generally transverse to said axial direction, and wherein said insert has a rearward facing shoulder abutting said seat shoulder.

2. A cutting tool as defined in claim 1 wherein the shoulder of said insert is formed intermediate the axial ends of said insert.

3. A cutting tool as defined in claim 2 wherein said abutting shoulders are generally vertical whereby a horizontal axial thrust is transmissible between them without generation of an upward thrust component on said insert.

4. A cutting tool as defined in claim 3 wherein said insert is provided with a second, forward facing shoulder and wherein said seat includes a rearward facing shoulder dependent therefrom adapted to abut said forward facing insert shoulder, whereby reverse axial thrust may be transmitted between said insert and said body.

5. A cutting tool as defined in claim 4 wherein said rearward facing shoulder dependent from said seat is integrally formed on said seat.

6. A cutting tool as defined in claim 5 wherein said second, forward facing shoulder is formed intermediate the axial ends of said insert.

7. A cutting tool as defined in claim 6 wherein said first and second shoulders of said insert are normal to said axial direction.

8. A cutting tool as defined in claim 7 wherein said first and second shoulders are formed as side walls of a channel opening in said insert.

9. A cutting tool as defined in claim 8 wherein said channel opening is coextensive with the transverse dimension of said insert at the position in which it is formed.

10. A cutting tool comprising a body having an axially elongated pocket in an end thereof, said pocket being defined by a horizontal base and at least one axially aligned shoulder upstanding therefrom, a replaceable seat having top and bottom surfaces contained in generally parallel planes indexably secured in said pocket by replaceable securing means, said seat having a land portion intermediate the ends thereof, a disposable insert mounted on said seat, said insert having a forwardly disposed cutting edge and a lateral side surface abutting axially aligned shoulder, said insert having a channel opening to closely receive upstanding shoulders of said land portion, clamp means secured to said body for exerting a clamping pressure on said insert.

11. A cutting tool as defined in claim 10 wherein said land portion has upstanding walls generally normal to said axial direction.

12. A cutting tool as defined in claim 11 wherein a purely horizontal axial thrust is transmitted between the land portion of said seat and said insert without generating an upward thrust component on said insert.

13. A cutting tool as defined in claim 12 wherein said pocket is further defined by a second axially aligned shoulder upstanding from said base.

14. A cutting tool as defined in claim 12 wherein said insert has axially aligned lateral side surfaces which contact said shoulders.

15. A cutting tool as defined in claim 11 wherein said upstanding walls are coextensive with the transverse dimension of said seat.

16. A cutting tool as defined in claim 14 wherein said channel opening connects said lateral side surfaces.

17. A cutting tool as defined in claim 10 wherein said clamp means comprises a clamp plate, and wherein means are provided to index said plate relative to said insert.

18. A cutting tool as defined in claim 17 wherein said means comprises laterally elongated teeth formed on a body contacting portion of said clamp plate which mesh with similar teeth formed on said body.

19. A cutting tool as defined in claim 18 wherein said means further comprises cheeks upstanding from said head in general axial alignment to contact lateral surfaces of said clamp plate.

20. A disposable cutting insert having two axially separated ends, at least one cutting edge disposed at a one axial end, said insert having top and bottom generally parallel surfaces and a bounding side surface including generally opposed lateral portions, a channel opening in at least said bottom surface said channel opening having wall portions generally normal to said axial direction.

21. A cutting insert as defined in claim 20 wherein said lateral portions of said insert are axially aligned.

22. A cutting insert as defined in claim 21 wherein said channel opening communicates with said lateral portions of said side surface.

23. A cutting insert as defined in claim 22 wherein the defined wall portions of said channel opening are contained in planes normal to said bottom surface.

24. A cutting insert as defined in claim 23 wherein said channel opening communicates with said transverse portions of said side surface.

25. A cutting insert as defined in claim 23 wherein said side surface slopes uniformly outwardly from said bottom surface.

26. A cutting insert as defined in claim 20 having a rotational axis of symmetry.

27. A cutting insert as defined in claim 26 wherein said rotational axis is normal to said top and bottom surfaces of said insert and passes through said channel opening.

28. A cutting insert as defined in claim 20 wherein said channel opening has a depth not exceeding 30% of the thickness of said insert.

* * * * *